United States Patent [19]

Yamada et al.

[11] Patent Number: 5,529,803
[45] Date of Patent: Jun. 25, 1996

[54] PLASTIC FATS AND CHOCOLATE

[75] Inventors: Kazuhisa Yamada, Sennan-gun; Tsugio Nishimoto, Naga-gun, both of Japan

[73] Assignee: Fuji Oil Company, Limited, Osaka-fu, Japan

[21] Appl. No.: 406,699

[22] Filed: Mar. 20, 1995

[30] Foreign Application Priority Data

Mar. 29, 1994 [JP] Japan .................................. 6-059493

[51] Int. Cl.⁶ ................................................. A23G 1/00
[52] U.S. Cl. ............................ 426/606; 426/607; 426/660
[58] Field of Search ........................... 426/606, 607, 426/660

[56] References Cited

U.S. PATENT DOCUMENTS

| | | | |
|---|---|---|---|
| 4,726,959 | 2/1988 | Momura | 426/607 |
| 4,839,192 | 6/1989 | Sagi | 426/607 |
| 4,877,636 | 10/1989 | Koyano | 426/607 |
| 4,883,684 | 11/1989 | Yang | 426/607 |
| 5,258,197 | 11/1993 | Wheeler | 426/607 |
| 5,271,950 | 12/1993 | Yamaguchi | 426/607 |
| 5,288,512 | 2/1994 | Seiden | 426/607 |
| 5,362,508 | 11/1994 | Wheeler | 426/607 |
| 5,378,490 | 1/1995 | Wheeler | 426/607 |
| 5,380,544 | 1/1995 | Klemann | 426/607 |
| 5,411,756 | 5/1995 | Wheeler | 426/607 |

*Primary Examiner*—Carolyn Paden
*Attorney, Agent, or Firm*—Wenderoth, Lind & Ponack

[57] ABSTRACT

A plastic fat which comprises not less than 50% by weight of LUS triglycerides, less than 10% by weight of triglycerides having the number of a total carbon atoms of constituent fatty acids (hereinafter abbreviated as TGC) of not more than 40 and less than 35% by weight of triglycerides having TGC of not less than 56 is disclosed. Chocolate comprising the above plastic fat as its fat ingredient is also disclosed.

3 Claims, No Drawings

PLASTIC FATS AND CHOCOLATE

FIELD OF THE INVENTION

The present invention relates to fats and chocolate having improved plasticity. The term "chocolate" is not limited to that prescribed by any law or standard and includes any chocolate and other fat processed products containing cacao butter substitutes.

BACKGROUND OF THE INVENTION

Most popular chocolate products are bar chocolate and cover chocolate for coating confectionery. However, in addition to them, there has been known the so-called plastic chocolate which is produced by providing a design to chocolate after cooling and solidification thereof and is mainly used for decoration of confectionery and cakes as an ornament.

For plastic chocolate, moldability and plasticity are required and, in order to provide chocolate with such properties, in general, a water-containing material such as a liquid sugar is added. However, chocolate using a liquid sugar has an undesirable flavor and mouthfeel and a fat blooming type appearance is caused due to evaporation of water during storage with time. In addition, there is a problem that chocolate becomes sticky.

As another method for providing chocolate with plasticity, the addition of a liquid oil to a fat ingredient of chocolate has been employed. However, there is a problem that, for example, formation of cracking or break of chocolate is caused even by application of a slight distortion to chocolate after solidification thereof and it is difficult to provide chocolate with sufficient plasticity by this method.

Furthermore, in JP-A 5-211841, chocolate is provided with plasticity after solidification by addition of cacao butter and soybean oil to a di-saturated-monolinoleate. However, the chocolate has insufficient shape retention at 26° C. or higher because of the addition of a liquid oil to the middle melting point fraction and is sticky and therefore it is necessary to use a high melting point ingredient together with these materials.

Thus, fats and chocolate having excellent plasticity with free from stickiness has not been reported heretofore in the prior art.

OBJECTS OF THE INVENTION

The main object of the present invention is to provide fats and chocolate having excellent plasticity with minimized stickiness.

This object as well as other objects and advantage of the present invention will become apparent to a person skilled in the art from the following description.

SUMMARY OF THE INVENTION

The present inventors have studied intensively to obtain fats and chocolate having excellent plasticity with minimized stickiness. As a result, it has been found that triglycerides composed of long chain fatty acids, unsaturated fatty acids and short chain fatty acid residues (hereinafter referred to as LUS triglycerides, provided that the positions of the residues are not limited to a specific one) have excellent plasticity.

In the LUS triglycerides used herein, the long chain fatty acid (L) represents C20:0 fatty acid (arachic acid), C22:0 fatty acid (behenic acid) or C24:0 fatty acid (lignoceric acid); the unsaturated fatty acid (U) represents C18:1 fatty acid (oleic acid or its isomer) or C18:2 fatty acid (linoleic acid or its isomer); and the short chain fatty acid (S) represent is C4:0 (butyric acid).

That is, according to the present invention, there is provided a plastic fat which comprises not less than 50% by weight of LUS triglycerides, less than 10% by weight of triglycerides having the number of a total carbon atoms of constituent fatty acids (hereinafter abbreviated as TGC) of not more than 40 and less than 35% by weight of triglycerides having TGC of not less than 56. The present invention also provides chocolate comprising the above plastic fat as its fat ingredient.

DETAILED DISCLOSURE OF THE INVENTION

The LUS triglycerides are not limited to a specific process but, in general, it can be produced by subjecting triglycerides having L, U or S as their constituent fatty acids and L, U or S fatty acids other than the above constituent fatty acids or their mono- or trihydric alcohol esters to interesterification and, if necessary, fractionating and separating high melting point and/or low melting point fractions.

Typically, the LUS triglycerides can be obtained by subjecting oils rich in oleic acid and linoleic acid together with C20:0, C22:0 and C24:0 esters and butyrate to interesterification. Examples of oils rich in oleic acid include high oleic sunflower oil, olive oil and the like. Examples of oils rich in linoleic acid include safflower oil, sunflower oil, corn oil, rapeseed oil, soybean oil and the like. Examples of esters of C20:0, C22:0 and C24:0 fatty acids include their methyl and ethyl esters and the like. Examples of butyrates include ethyl butyrate, methyl butyrate and the like. A catalyst to be used for interesterification is not limited to a specific one and, normally, an alkaline metal catalyst such as sodium methylate or a lipase having 1,3-position specificity can be used.

SUS, SUU and UUU (low melting point fats) as well as LUL and LUU (high melting point fats) are formed during interesterification as by-products. In the present invention, among the low melting point fats, the content of triglycerides having TGC of 40 or less should be less than 10% by weight, i.e., <10% by weight. The content of triglycerides having TGC of 56 or more should be less than 35% by weight, i.e., <35% by weight.

When the content of triglycerides having TGC of 40 or less is not less than 10% by weight, the plasticity is lowered and, at the same time, the thermal resistance is lowered. On the other hand, when the content of triglycerides having a TGC of 56 or more is not less than 35% by weight, the plasticity is lowered and, at the same time, the melting properties in the mouth of chocolate, using such fat, is deteriorated.

Such by-products can be removed by a known fractionation method such as pressurized filtration fractionation, solvent fractionation and the like. Solvent fractionation is advantageous to industrial production. From the economical viewpoint and by taking into consideration the fractionation ability, it is preferred to conduct the fractionation so that the amount of LUS triglycerides becomes 50 to 80% by weight, based on the total weight of the interesterified fat.

The interesterified fat thus obtained can be used as it is as the plastic fat of the present invention. Alternatively, any suitable other fat or oil can be added to the interesterified fat with maintaining the above triglyceride composition, or it is subjected to hydrogenation to adjust its melting point.

The plastic fat of the present invention has excellent plasticity and can be used as a substantial fat ingredient of chocolate production to utilize its excellent plasticity. The substantial fat ingredient used herein means that the chocolate contains the plastic fat of the present invention in an amount of 70% by weight or more of the total fat ingredients of the chocolate.

The chocolate of the present invention can be produced according to a conventional method. That is, in addition to the plastic fat of the present invention, the chocolate can contain conventional ingredients, for example, cocoa, sugars, powdered sugar, emulsifying agents, flavoring agents, coloring agents and the like. In addition, nut powder such as almond powder, peanut butter, grated cheese and the like can be used instead of cacao ingredient to provide flavor other than chocolate. Furthermore, the so-called colored chocolate obtained by coloring a white chocolate base can be produced.

Chocolate can be produced by cooling and solidifying a molten mixture of refined raw materials according to a conventional method. Any tempering operation is not required.

The chocolate thus obtained has good flavor and mouthfeel with minimized stickiness and also has excellent plasticity, such as bending properties. Any desired design can be readily provided according to a particular purpose by changing its shape to desired one by, for example, by extrusion molding, rolling with a rolling pin, roller or the like, and whittling and the like. For example, chocolate is molded into a sheet. The sheet can be punched out in the shape of a leaf, followed by curving it to obtain an ornament, can be shaped into roses or can be placed on a side wall of cake. Or, plural sheets of chocolate having different colors can be laminated and shaped in a roll, eddy or the like. Or, chocolate can be extrusion-molded in the shape of a bar containing a center having a different shape and extending through the bar.

The following Examples and Comparative Examples further illustrate the present invention in detail but are not to be construed to limit the scope thereof. In the Examples and Comparative Examples, all the percents and parts are by weight.

EXAMPLE 1

Deacidified high oleic sunflower oil (38 parts) and behenic acid ethyl ester (62 parts) were interesterified with a lipase having 1,3-specificity and the ethyl ester part was distilled off. The resultant triglyceride fraction was subjected to hexane single stage fractionation to remove the low melting point fraction to obtain an LUL fraction. This LUL fraction (85 parts) and ethyl butyrate (15 parts) were interesterified with the same lipase and the ethyl ester part was distilled off. The resultant triglyceride fraction was subjected to hexane-acetone double stage fractionation to obtain LUS triglyceride fraction (middle melting point fraction), yield: 17.4%, LUS content: 79.3%, iodine value (IV): 39.6, softening melting point: 27.5° C.

EXAMPLE 2

The middle melting point fraction obtained in Example 1 was hydrogenated to obtain a hardened oil having softening melting point of 33.0° C. and IV of 31.0.

EXAMPLE 3

The yield of hexane-acetone double stage fractionation of Example 1 was changed to 21.3% to obtain LUS triglyceride fraction (middle melting point fraction), LUS content: 53.2%, IV: 33.7, softening melting point: 33.9° C.

EXAMPLE 4

Deacidified high oleic sunflower oil (38 parts), behenic acid ethyl ester (47 parts) and ethyl butyrate (15 parts) were interesterified with a lipase having 1,3-specificity and the ester part was distilled off. The resultant crude LUS triglycerides (38 parts), behenic acid ethyl ester (47 parts) and ethyl butyrate (15 parts) were interesterified with the same lipase again and the ester part was distilled off. The resultant triglyceride fraction was subjected to hexaneacetone double stage fractionation to obtain LUS triglyceride fraction (middle melting point fraction) yield: 44.8% LUS content: 63.6% IV 35.7. This middle melting point fraction was hydrogenated to obtain a hardened oil having softening melting point of 31.9° C. and IV of 28.1.

COMPARATIVE EXAMPLE 1

The interesterified oil prior to subjecting hexaneacetone fractionation in Example 4 was used ouch that the LUS content: 39.3%, SUS+SUU content: 13.6% LUU+LUL content: 39.7% IV: 31.4.

COMPARATIVE EXAMPLE 2

Safflower oil (20 parts) and ethyl stearate (80 parts) were interesterified with a lipase having 1,3-specificity and the ethyl ester part was distilled off. The triglyceride fraction was subjected to acetone single stage fractionation to obtain a high melting point fraction, yield: 60.0%. This high melting point fraction (50 parts), cacao butter (20 parts) and soybean oil (30 parts) were mixed, IV: 71.6.

This high melting point fraction was mainly composed of 1,3-stearyl-2-linoleate which corresponded to the fat used in the plastic chocolate of JP-A 5-211841.

The compositions of fats thus obtained are summarized in Table 1.

TABLE 1

| TGC of Examples 1–3 and Comparative Examples 1–2 | | | | | |
| --- | --- | --- | --- | --- | --- |
| TGC | Examples 1,2 | Example 3 | Example 4 | Comp. Example 1 | Comp. Example 2 |
| 40 (SUU) or less | 7.1% | 5.3% | 7.4% | 13.6% | 0.0% |
| 42 (LUS) | 5.3 | 2.8 | 4.4 | 4.9 | 0.0 |
| 44 (LUS) | 72.5 | 45.9 | 56.3 | 31.6 | 0.0 |
| 46 (LUS) | 1.5 | 4.5 | 2.9 | 2.8 | 0.0 |
| 48 | 1.0 | 7.0 | 2.1 | 4.0 | 0.4 |
| 50 | 0.2 | 1.2 | 0.5 | 0.5 | 7.3 |
| 52 | 0.6 | 0.5 | 0.6 | 0.9 | 26.5 |
| 54 | 1.9 | 1.0 | 1.0 | 2.0 | 64.5 |
| 56 (LUU) | 1.3 | 7.2 | 2.6 | 2.5 | 1.2 |
| 58 (LUU, LUL) | 5.8 | 7.3 | 16.0 | 10.4 | 0.1 |
| 60 (LUU, LUL) | 0.8 | 5.4 | 2.5 | 5.2 | 0.0 |
| 62 (LUL) or more | 2.0 | 11.9 | 3.7 | 21.6 | 0.0 |

Chocolate test

The fats obtained in Examples 1–4 and Comparative Examples 1 and 2 were used as test fats to produce chocolate and subjected to the following test. The formulation of the chocolate was cocoa powder (8.0 parts), whole milk powder (10.0 parts), skimmed milk powder (12.0 parts), powdered sugar (35.0 parts), test fat (35.0 parts) lecithin (0.4 part), vanillin (0.02 part) and flavor (0.02 part). No tempering operation was carried out and the chocolate was shaped in a sheet of 5 cm sides and 2 mm in thickness and a bar of 6 cm×2 cm and 5 mm in thickness. The chocolate was cooled and solidified at 5° C. for 30 minutes.

Plasticity was tested by bending both ends of the above sheet-shaped chocolate with hands so that the tangent angle of both end surfaces became 90° and observing cracking.

Sticking test was carried out by maintaining the chocolate at 50° C., covering surfaces of biscuit, cooling and solidifying at 5° C. for 30 minutes, aging at 20° C. for 1 week and then allowing to stand at 26°, 27° or 28° C. for 2 hours to evaluated sticking with fingers according to the following criteria:

A: no sticking
B: slightly sticking
C: sticking

Likewise, melting in the mouth was evaluated after aging at 20° C. for 1 week.

The results are shown in Table 2.

TABLE 2

| Test fat | Plasticity | Sticking 26° C. | 27° C. | 28° C. | Melting in mouth |
| --- | --- | --- | --- | --- | --- |
| Ex. 1 | no cracking | A | B | B | very good |
| Ex. 2 | no cracking | A | A | A | very good |
| Ex. 3 | no cracking | A | A | A | good |
| Ex. 4 | no cracking | A | A | A | good |
| Comp. Ex. 1 | cracking | A | A | A | bad |
| Comp. Ex. 2 | no cracking | C | C | C | very good |

As seen from Table 2, the chocolate using the test fat of Comparative Example 1 wherein LUS triglyceride content is relatively low (39.3%), the content of triglycerides having TGC of not more than 40 is relatively large (13.6%) and a large amount of triglycerides having TGC of not less than 56 is contained (39.7%) shows cracking and inferior plasticity. Although the chocolate using the test fat of Comparative Example 2 mainly composed of 1,3-stearyl-2-linoleate does not show cracking and has good plasticity, it shows sticking at 26° C. To the contrary, the chocolates using the test fats of Examples 1 to 4 do not have such problems.

Thus, it has been demonstrated that plasticity and sticking are improved by adjusting the triglyceride composition of a fat ingredient of chocolate to the specific range.

As described hereinbefore, according to the present invention, chocolate which requires any tempering operation and has improved moldability and plasticity as well as good flavor and mouthfeel without stickiness can be obtained.

What is claimed is:

1. A chocolate comprising as a fat ingredient a plastic fat which contains not less than 50% by weight of LUS triglycerides, less than 10% by weight of triglycerides having the number of a total carbon atoms of constituent fatty acids (TGC) of not more than 40 and less than 35% by weight of triglycerides having a TGC of not less than 56, wherein L represents a residue of 20:0 fatty acid (arachic acid), C 22:0 fatty acid (behenic acid) or C 24:0 fatty acid (lignoceric acid); U represents a residue of C 18:1 fatty acid (oleic acid or its isomer) or C 18:2 fatty acid (linoleic acid or its isomer); and S represents the residue of C 4:0 (butyric acid).

2. The chocolate according to claim 1, wherein the content of LUS triglycerides in the plastic fat is 50 to 80% by weight.

3. The chocolate according to claim 1, wherein the content of the plastic fat is not less than 70% by weight based on the total weight of the fat ingredient.

* * * * *